US012770598B1

(12) United States Patent
Abel

(10) Patent No.: US 12,770,598 B1
(45) Date of Patent: Oct. 20, 2026

(54) METHOD AND SYSTEM FOR ACOUSTICS SIMULATION INCLUDING SPATIAL FEATURES USING MODAL DECOMPOSITION

(71) Applicant: Jonathan S. Abel, Menlo Park, CA (US)

(72) Inventor: Jonathan S. Abel, Menlo Park, CA (US)

( * ) Notice: Subject to any disclaimer, the term of this patent is extended or adjusted under 35 U.S.C. 154(b) by 300 days.

(21) Appl. No.: 18/066,120

(22) Filed: Dec. 14, 2022

Related U.S. Application Data

(63) Continuation-in-part of application No. 17/361,057, filed on Jun. 28, 2021, now abandoned, which is a continuation of application No. 16/384,266, filed on Apr. 15, 2019, now Pat. No. 11,049,482, which is a continuation of application No. 15/796,327, filed on Oct. 27, 2017, now Pat. No. 10,262,645, which is a continuation of application No. 14/558,531, filed on Dec. 2, 2014, now Pat. No. 9,805,704.

(60) Provisional application No. 62/061,219, filed on Oct. 8, 2014, provisional application No. 61/913,093, filed on Dec. 6, 2013, provisional application No. 61/910,548, filed on Dec. 2, 2013.

(51) Int. Cl.
*G10H 5/02* (2006.01)
*G10H 1/00* (2006.01)

(52) U.S. Cl.
CPC ............ *G10H 5/02* (2013.01); *G10H 1/0091* (2013.01); *G10H 2210/285* (2013.01); *G10H 2210/291* (2013.01); *G10H 2250/531* (2013.01)

(58) Field of Classification Search
None
See application file for complete search history.

(56) References Cited

U.S. PATENT DOCUMENTS

| | | | |
|---|---|---|---|
| 2,230,836 | A | 2/1941 | Hammond |
| 3,267,197 | A | 8/1966 | Hurvitz |
| 4,099,027 | A | 7/1978 | Whitten |
| 5,491,754 | A | 2/1996 | Jot et al. |
| 5,502,747 | A | 3/1996 | McGrath |

(Continued)

OTHER PUBLICATIONS

Abel et al., "Luciverb: Iterated Convolution for the Impatient," Audio Engineering Society Convention 133, Oct. 2012, pp. 1-10.

(Continued)

*Primary Examiner* — James K Mooney
(74) *Attorney, Agent, or Firm* — FOLEY & LARDNER LLP

(57) ABSTRACT

A method and system for synthesizing acoustics including its spatial content via modal analysis of a room or resonating object is described. In one embodiment of the inventive system, a parallel set of resonant mode filters is employed to simulate the effect of a room or resonating object acting on a source generating a signal at a source position, and picked up by a listener at a listener position. In the embodiment, each mode filter is driven by the source signal according to a mode source gain, and the mode filter outputs are summed according to mode listener gains to form a listener signal. In another embodiment, instantaneous arrival directions associated with the modes, and the source and listener positions are used to spatialize sound energy arriving at the listener from the source in the simulated acoustic over loudspeakers or headphones.

14 Claims, 4 Drawing Sheets

(56) References Cited

U.S. PATENT DOCUMENTS

| | | | | |
|---|---|---|---|---|
| 5,748,513 | A | 5/1998 | Van Duyne | |
| 6,284,965 | B1 | 9/2001 | Smith et al. | |
| 9,805,704 | B1 | 10/2017 | Abel | |
| 9,940,922 | B1 * | 4/2018 | Schissler | H04S 7/305 |
| 2007/0058816 | A1 * | 3/2007 | Ko | H04R 5/04 381/1 |
| 2008/0232603 | A1 | 9/2008 | Soulodre | |
| 2009/0052682 | A1 | 2/2009 | Kuroiwa | |
| 2009/0082691 | A1 | 3/2009 | Denison et al. | |
| 2010/0144306 | A1 | 6/2010 | Karr | |
| 2010/0296662 | A1 * | 11/2010 | Tanaka | H04S 7/305 381/387 |
| 2011/0064235 | A1 | 3/2011 | Allston | |
| 2011/0305347 | A1 | 12/2011 | Wurm | |
| 2012/0011990 | A1 | 1/2012 | Mann | |
| 2013/0202125 | A1 | 8/2013 | De Sena et al. | |
| 2014/0161268 | A1 * | 6/2014 | Antani | H04S 7/305 381/63 |
| 2016/0269828 | A1 | 9/2016 | Smith et al. | |
| 2016/0275956 | A1 | 9/2016 | Lee et al. | |
| 2017/0134854 | A1 | 5/2017 | Lindahl et al. | |
| 2021/0097972 | A1 | 4/2021 | Herman et al. | |

OTHER PUBLICATIONS

Abel et al., "A Modal Architecture for Artificial Reverberation with Application to Room Acoustics Modeling," 137 Conv. Audio Eng'g Soc'y (presented Oct. 9-12, 2014, Los Angeles, USA), 10 pages.

Abel, Jonathan et al., "Distortion and Pitch Processing Using a Modal Reverberator Architecture," Proc. of the 18th Int. Conference on Digital Audio Effects, Dec. 3, 2015, pp. 1-8.

Della Pietra et al., "On the Dynamic Behavior of Axially Excited Helical Springs," MECCANICA, vol. 17, pp. 31-43, 1982.

Fletcher et al., "The Physics of Musical Instruments," 2nd ed., Springer, 2010, pp. 128-130.

Garcia, "Optimal Filter Partition for Efficient Convolution with Short Input/output Delay," Audio Engineering Society Convention 113, Oct. 2002, pp. 1-9.

Gardner, "Efficient Convolution without Input-Output Delay," J. Audio Eng. Soc., vol. 43, No. 3, pp. 127-136, 1995.

Jot, "Digital Delay Networks for Designing Artificial Reverberators," in Audio Engineering Society Convention 90, Feb. 1991, pp. 1-17.

Karjalainen et al., "More about this reverberation science: Perceptually good late reverberation." Audio Engineering Society (2001).

Kereliuk, Corey, et al., "Modal Analysis of Room Impulse Responses Using Subband Esprit," Proceedings of the 21st International Conference on Digital Audio Effects, Sep. 8, 2018, pp. 334-341.

Lee et al., "A Reverberator with Two-Stage Decay and Onset Time Controls," Audio Engineering Society Convention 129, preprint No. 8208, Nov. 2010, pp. 1-6.

Lin et al., "Modal Parameter Identification Based on Singular Value Decomposition and Backward Prediction," 2010, 8th IEEE Int'l Conf. on Control and Automation (presented Jun. 9-11, 2010, Xiamen, China), pp. 1124-1127.

Makivirta et al., "Low-Frequency Modal Equalization of Loudspeaker-Room Responses," AES 111, Sep. 2001.

Matthews et al., "Methods for Synthesizing Very High {Q} Parametrically Well Behaved Two Pole Filters," Proc. Swedish Musical Acoustics Conference, Aug. 2003, pp. 1-4.

Meinema et al., "A New Reverberation Device for High Fidelity Systems," J. Audio Eng. Soc., vol. 9, No. 4, pp. 284-289, 324-326, 1961.

Morse et al., "Theoretical Acoustics", Princeton University Press, 1987, pp. 467-607.

Philip et al., "Estimation of Modal Parameters of Low Frequency Oscillations in Power System Using Hankels Total Least Square Method," 2018 IEEE Innovative Smart Grid Technologies—Asia (presented May 22-25, 2018, Singapore), pp. 764-769.

Schroeder, "Natural Sounding Artificial Reverberation," Audio Engineering society Convention, Oct. 13, 1961, pp. 1-18.

Vallmaki et a., "Fifty Years of Artificial Reverberation," IEEE Transactions on Audio, Speech, and Language Processing, vol. 20, No. 5, pp. 1421-1448, Jul. 2012.

* cited by examiner

METHOD AND SYSTEM FOR ACOUSTICS SIMULATION INCLUDING SPATIAL FEATURES USING MODAL DECOMPOSITION

CROSS-REFERENCE TO RELATED APPLICATIONS

The present application is a continuation-in-part of U.S. patent application Ser. No. 17/361,057 filed Jun. 28, 2021, which application is a continuation of U.S. patent application Ser. No. 16/384,266 filed Apr. 15, 2019, now U.S. Pat. No. 11,049,482, which application is a continuation of U.S. patent application Ser. No. 15/796,327, filed Oct. 27, 2017, now U.S. Pat. No. 10,262,645, which application is a continuation of U.S. patent application Ser. No. 14/558,531, filed Dec. 2, 2014, now U.S. Pat. No. 9,805,704, which application claims priority to U.S. Provisional Application. No. 61/910,548, filed Dec. 2, 2013, U.S. Provisional Application. No. 61/913,093, filed Dec. 6, 2013 and U.S. Provisional Application. No. 62/061,219, filed Oct. 8, 2014, the contents of all such applications being hereby incorporated by reference herein in their entireties.

TECHNICAL FIELD

The present invention relates generally audio signal processing, particularly computational structures for simulating acoustic spaces and vibrating objects including the spatial content of the wavefield created.

BACKGROUND

In simulating acoustics, reproducing the spatial character of a room is important. The evolution from sound arriving directly from the source to appearing as reflections from objects and surfaces near the source and listener, and finally enveloping the listener as sound energy permeates the space, provides important psychoacoustic cues about the space and the sound source. Such cues are critical in a wide range of scenarios, including music and film audio production, and gaming, and particularly in settings in which sound sources and listeners are in motion, and in very reverberant spaces which readily reveal their architecture and materials through their acoustics.

Digital reverberators are typically implemented using either delay line networks or convolution (V. Valimaki, J. D. Parker, L. Savioja, J. O. Smith, and J. S. Abel, "Fifty Years of Artificial Reverberation," IEEE Transactions on Audio, Speech, and Language Processing, vol. 20, no. 5, pp. 1421-1448 July, 2012.). In simulations based on convolution, measured or synthesized impulse responses are used to process source signals. While accurate for the particular measured or synthesized configuration, they are difficult to interactively adjust in response to a moving source or listener. They can require significant memory resources, and include computational latency that is unacceptable in many scenarios (W. G. Gardner, "Efficient Convolution without Input-Output Delay," J. Audio Eng. Soc., vol. 43, no. 3, pp. 127-136, 1995; D. S. McGrath, "Method and apparatus for filtering an electronic environment with improved accuracy and efficiency and short flow-through delay," U.S. Pat. No. 5,502,747, Mar. 26, 1996; G. Garcia, "Optimal Filter Partition for Efficient Convolution with Short Input/Output Delay," in Audio Engineering Society Convention 113, October 2002.).

Networks of delay lines and filters can be configured to produce responses that are perceptually similar to those of room reverberation, with a set of early reflections giving way to a dense late field reverberation (J. M. Jot. "Digital Delay Networks for Designing Artificial Reverberators," in Audio Engineering Society Convention 90, February 1991). Using such structures, gross reverberation features, e.g., the late field reverberation equalization and decay times, may be interactively adjusted, but details of the timbre are difficult to control.

Neither convolution nor traditional delay network structures are well suited to produce accurate spatial cues for positioned or moving sources and listeners. Using convolution, the impulse responses would have to be measured on a dense grid, and there isn't a clear approach to interpolate impulse responses between measurement positions. Scattering delay networks offer a computationally efficient delay network approach for simulating acoustics that can approximate aspects of the spatial character of the soundfield (E. De Sena, H. Hacihabiboglu, Z. Cvetkovic, and J. O. Smith, "Efficient synthesis of room acoustics via scattering delay networks," IEEE/ACM Trans. on Audio, Speech, and Lang. Proc., vol. 23, no. 9, pp. 1478-1492, 2015). However, they may be expensive to compute, as directional filters are placed on many separate paths between the source and the listener, and a fair amount of delay line manipulation is required for moving sources.

Thus there is a need for an artificial reverberator that both can faithfully reproduce a given acoustic space, including its spatial content, and can be interactively controlled, with the ability to position and move both sources and listeners. There is also a need for an artificial reverberation method that requires little memory.

In music, film, and location-based entertainment settings, listeners often experience sound over loudspeakers placed about the listening space, for instance in a home or movie theater surround sound configuration. In many video game and virtual and augmented reality settings, listeners hear sound through headphones. In these different listening environments, it is important to preserve the spatial nature of the soundfield to the extent possible.

Thus there is a need for an artificial reverberator that can reproduce the spatial character of a soundfield in a variety of listening environments, including over loudspeakers and headphones.

SUMMARY OF THE INVENTION

The present embodiments consider room reverberation from the point of view of modal analysis, and describes an artificial reverberation method that includes spatial cues based on a modal decomposition of a desired reverberation impulse response. According to some aspects, embodiments provide an artificial reverberator system and method which has a small memory footprint, and is simultaneously interactively controllable and faithful to a desired acoustic space or resonant object. Another object of the embodiments is to provide accurate simulation of and interactive control over the spatial character of the sources and listeners within the simulated environment.

In one embodiment, an artificial reverberator is implemented using a parallel set of resonant "mode" filters, each identified with a resonant mode, and each mode having an associated resonant frequency, damping, and one or more input gains and output gains. In this embodiment, each input gain is adjusted according to its respective source position and each output gain is adjusted according to its respective listener position. In an embodiment of the present invention applicable to the case of only one source or only one listener, the source and listener gains are combined.

In further embodiments, instantaneous arrival directions associated with the modes and listener positions are computed, and are used to spatialize sound energy arriving at the listeners from the sources in the simulated acoustic over loudspeakers or headphones.

In these and other embodiments, loudspeaker reproduction includes surround sound, Ambisonics, VBAP and other panning-type processes, while headphone reproduction includes binaural rendering of 3D audio cues.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
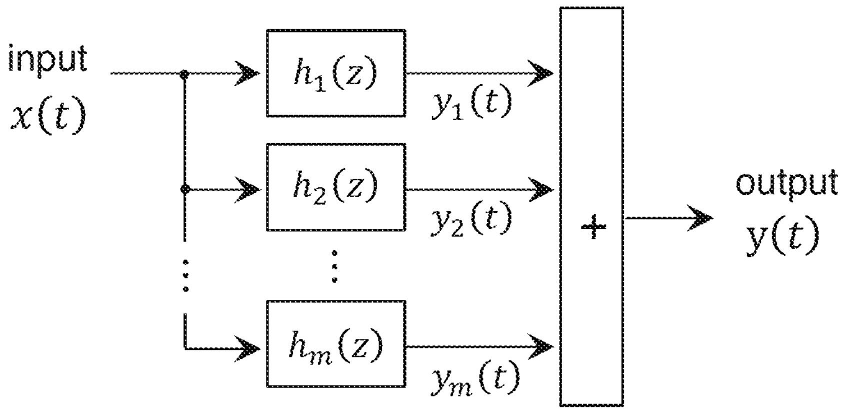
FIG. 1 illustrates an example Modal Reverberator Architecture according to embodiments. The modal reverberator is the parallel combination of resonant filters matched to the modes of the system.

In general, the present embodiments consider room reverberation from the point of view of modal analysis, and describes an artificial reverberation method that includes spatial cues based on a modal decomposition of a desired reverberation impulse response. Modal analysis of acoustic spaces is well established, describing room reverberation as the linear combination of characteristic resonances (P. M. Morse and K. U. Ingard, Theoretical Acoustics, Princeton University Press, 1987; N. Fletcher and T. Rossing, The Physics of Musical Instruments, 2nd ed., Springer, 2010). In the following, a computational structure employing a modal decomposition is described for synthesizing room reverberation and the reverberant responses of resonant objects and systems. The structure, called a "modal reverberator" implement room (or object) modes using separate resonant filters, each driven by the source signal and summed in a parallel structure to form the output, as seen in FIG. 1. The parallel architecture provides explicit, interactive control over the parameters of each mode (gain, resonant frequency, and damping), allowing accurate modeling of acoustic spaces, including of their spatial character. An inventive step is to associate the mode filter gains with the source and listener positions, and the mode filter resonant frequencies and dampings with the room or object. In this way, the source and listener may be moved and the associated changes in spatial character expressed by simply varying the respective mode gains. In the presence of multiple sources and listeners, the mode gains may be split into a matrix of mode input gains determined by the source positions, and a matrix of mode output gains determined by the listener positions.

In the following, the inventive system and method are described, with a two-dimensional idealized room presented to illustrate aspects of the invention.

A. Modal Reverberator

Denoting by $h(t;\ \xi_s,\ \xi_l)$ the impulse response of a linear system measured between an input signal (source) position $\xi_s$ and an output signal (listener) position $\xi_l$, where t is the discrete time sample index, the system output y(t) can be written as a convolution of the impulse response with the input x(t), $$y(t) = h(t) * x(t), \tag{1}$$

where the impulse response dependence on the source and listener positions has been suppressed.

Acoustic spaces and vibrating objects have long been analyzed in terms of their normal modes [6], [7], and the system impulse response h(t) may be expressed as the linear combination of modal responses, $$h(t) = \sum_{m=1}^{M} h_m(t), \tag{2}$$

where the system has M modes, with the mth mode response denoted by $h_m(t)$. In this way, the response at a listener position $\xi_l$ to the signal x(t) from a source at $\xi_s$ is seen to be the sum of the mode outputs, $$y(t) = \sum_{m=1}^{M} y_m(t),\ y_m(t) = h_m(t) * x(t), \tag{3}$$

where the mth mode output $y_m(t)$ is the mth mode response convolved with the input.

The mode responses $h_m(t)$ are complex exponentials each characterized by a mode frequency $\omega_m$, mode damping am and complex mode amplitude $\gamma_m$, $$h_m(t) = \gamma_m \exp\{(j\omega_m - \alpha_m)t\}. \tag{4}$$

The modal reverberator is simply the parallel combination of mode filters, each computing the response to a particular mode, as expressed by (3) and shown in FIG. 1. Any number of numerically stable methods may be used to implement the resonant mode filters, including phasor filters (M. Mathews and J. O. Smith, "Methods for Synthesizing Very High Q Parametrically Well Behaved Two Pole Filters," in Proc. Swedish Musical Acoustics Conference, August 2003) in which each mode filter is implemented as a complex first-order update, $$y_m(t) = \gamma_m x(t) + e^{(j\omega_m - \alpha_m)} y_m(t-1). \tag{5}$$

Using this architecture, rooms and objects may be simulated by tuning the filter resonant frequencies and dampings to the corresponding room or object mode frequencies and decay times. The parallel structure allows the mode parameters to be separately adjusted, while the first-order update provides interactive control with no computational latency.

B. Spatial Response Simulation

It should be pointed out that the mode frequencies $\omega_m$ and dampings $\alpha_m$ are properties of the room or object, and describe the mode oscillation frequencies and decay times. By contrast, the mode amplitudes $\gamma_m$ are determined by the sound source and listener positions (driver and pick-up positions, say, for an electro-mechanical device), according to the spatial patterns of the modes. In particular, the mode frequencies and dampings relate to the room temporal response, and the mode gains relate to the room spatial response.

Consider a two-dimensional square room with perfectly reflecting walls, extending from [0, 1] in normalized distance units along horizontal and vertical axes $(\xi_1, \xi_2)$. In this case, the room mode impulse responses are sinusoidal in time and space, with the sound pressure of the $(m_1,m_2)$ mode given by $$p_{m_1,m_2}(t, \xi) = \cos(k_{m_1}\xi_1)\cos(k_{m_2}\xi_2)\exp\{i\omega_{m_1,m_2}t\}, \tag{6}$$

where the mode frequency $\omega_{m1,m2}$ and wavenumbers $k_{m1}$ and $k_{m2}$ are $$\omega_{m_1,m_2} = \sqrt{m_1^2 + m_2^2}, \; k_{m_1} = m_1\pi, \; k_{m_2} = m_2\pi, \tag{7}$$

and where time t is normalized so that the sound propagation speed is 1.0. (Note that there is no damping, $\alpha_{m1,m2}=0$ due to the perfectly reflecting walls.) In other words, the response is a spatial pattern of peaks and troughs that oscillates over time.

To find the response of this system for a listener at $\xi_l$ to a sound source at $\xi_s$, the various mode temporal responses are convolved with the source signal, and summed according to the mode spatial responses evaluated at the listener position. In other words, with $$h_{m_1,m_2}(t) = \gamma_{m_1,m_2}(\xi_s, \xi_l)\exp\{(j\omega_{m_1,m_2}\}. \tag{8}$$

Here the mode filter gain $\gamma_{m1,m2}$ represents the coupling between the source and the system mode, and the listener and the system mode. It is the product of the projection of the source spatial position and extent onto the mode spatial pattern, and the listener spatial position and extent onto the mode spatial pattern, say $$\gamma_{m_1,m_2}(\xi_s, \xi_l) = \gamma_s(\xi_s)\gamma_l(\xi_l). \tag{9}$$

For a point omni-directional microphone, the listener gain is simply the mode spatial function evaluated at the listener position $$\gamma_l(\xi_l) = \cos(k_{m_1}\xi_{l_1})\cos(k_{m_2}\xi_{l_2}). \tag{10}$$

In this way, the listener position can me moved about the space simply by adjusting the mode gains according to the mode spatial patterns. Likewise multiple listeners can be simulated by multiple mixes of the modal filter outputs according to the respective listener gains.

It should be pointed out that in more complicated geometries, or in the presence of absorbing walls, the spatial patterns will be different, and possibly difficult to compute analytically or via a priori computer simulation. In such cases, they may be inferred from impulse response measurements made within the space. This could be done by estimating the mode frequencies, dampings, and gains, say using E. Maestre, J. S. Abel, J. O. Smith, "Constrained pole optimization for modal reverberation," in Proceedings of the $20^{th}$ International Conference on Digital Aud, at multiple points or along multiple directions in a space. The sum of magnitude squared wavenumbers is proportional to the magnitude squared mode frequency via the speed of sound, and the multiple measurements constrain the different wavenumber components, the resulting mode response is $$h_m(t) = \exp\{(jk_m^T\xi\}\exp\{(j\omega_m\}. \tag{11}$$

Now, consider the arrival direction of sound energy for a given mode as a function of position in the room. The sound pressure $p(t, \xi)$ and volume flow $u(t, \xi)$ are related by $$\frac{\partial p(t, \xi)}{\partial \xi_i} = \rho \frac{\partial u(t, \xi)}{\partial t}, \tag{12}$$

the acoustic form of Newton's second law of motion, where $\rho$ is the mass density. Normalizing rho=1, and integrating, we have an expression for the volume flow, $$u(t, \xi) = \int_{t_0}^{t_0+\delta} \frac{\partial p(t, \xi)}{\partial \xi_i} dt, \tag{13}$$

The arrival direction at any given point in space and time, i.e. the negative volume flow direction at that point, is that of the spatial gradient of the mode and oscillating at the mode frequency.

In the two-dimensional example above, we have $$\begin{bmatrix} u_{m_1}(t,\xi) \\ u_{m_2}(t,\xi) \end{bmatrix} = -\begin{bmatrix} k_{m_1}\sin(k_{m_1}\xi_1)\cos(k_{m_2}\xi_2) \\ k_{m_2}\cos(k_{m_1}\xi_1)\sin(k_{m_2}\xi_2) \end{bmatrix}\exp\{j\omega_{m_1,m_2}t\}/(j\omega_{m_1,m_2}). \tag{14}$$

Figure 2:
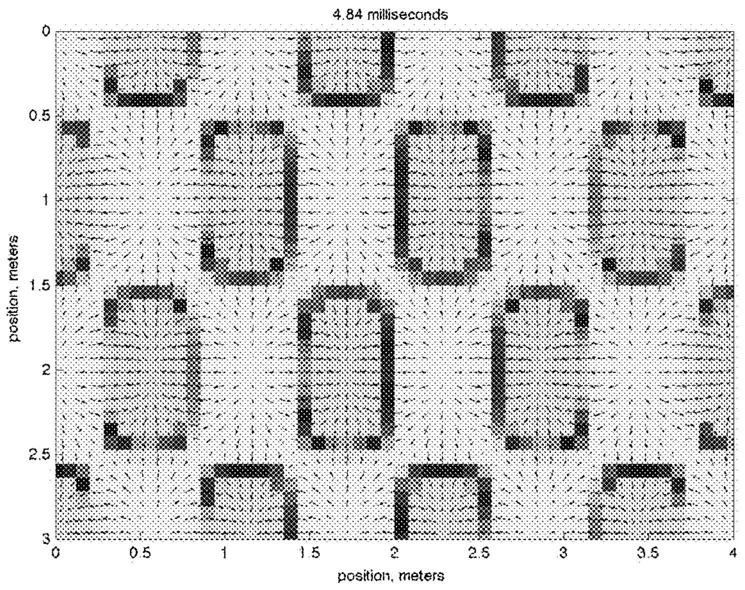
FIG. 2 illustrates an example Spatial Mode Pattern with Arrival Directions according to embodiments.

This is illustrated in FIG. 2 for a 4×3 rectangular room and $(m_1,m_2)=(7, 3)$ at a particular point in time. The mode spatial distribution is shown with amplitude being indicated by color, and overlaid with arrows showing negative particle velocity (i.e., the arrival direction scaled by speed) as a function of position as computed by the expressions above. Note that the velocities are largest at the boundaries between high-pressure and low-pressure regions.

Figure 3:
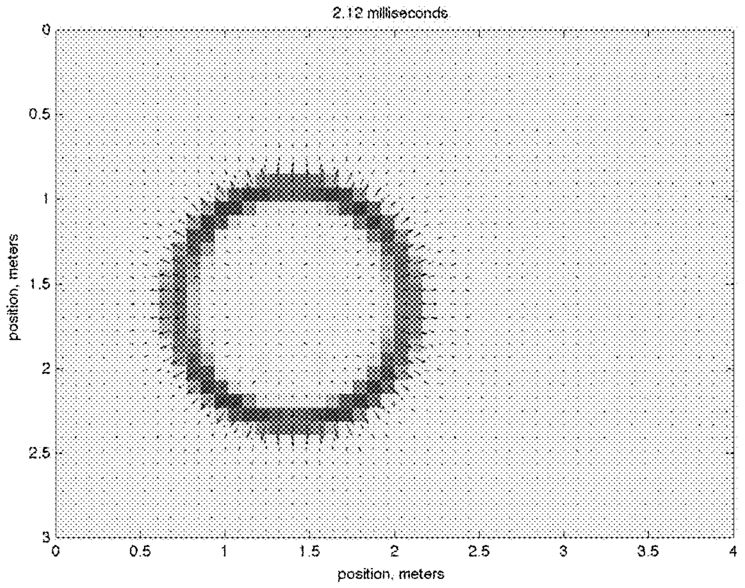
FIGS. 3, 4 and 5 illustrate an example sequence of Room Impulse Propagation with Arrival Directions according to embodiments.
Figure 4:
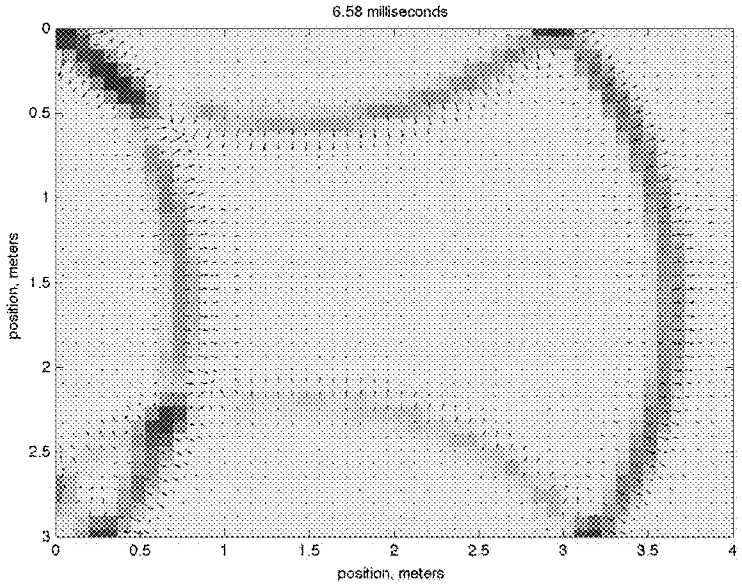
Figure 5:
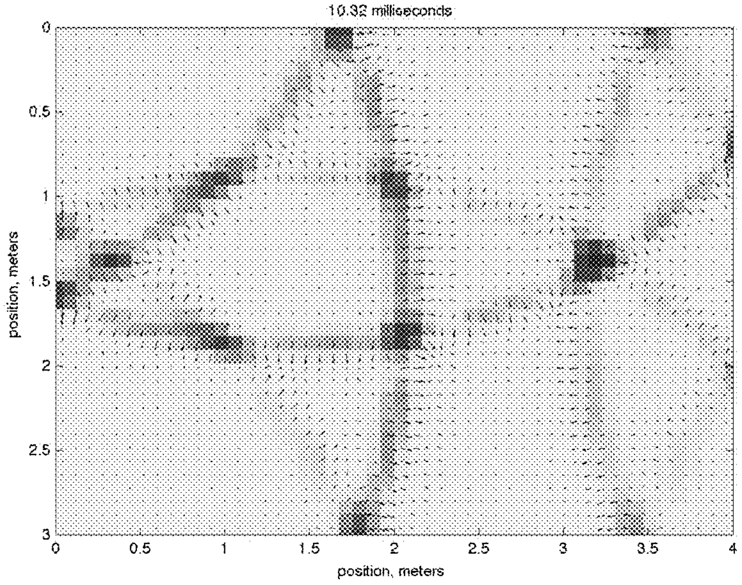

The arrival direction of wavefront propagating in the space may be formed by adding the negative volume flows, weighted by the mode gains. This is illustrated in the sequence of images in FIG. 3, FIG. 4, and FIG. 5. There is a source radiating a pulse into the space, captured at four times, first before the resulting wavefront interacts with any room walls, the second after reflections with the top, bottom, and left walls, and the third after the wavefront reflected from the right wall.

The arrival directions are plainly visible on the leading wavefront edges. What is remarkable is that these moving wavefronts and discrete arrivals (with associated directions) result from a set of in some sense motionless standing waves. In addition, a listener at any fixed position will experience a complete set of directional arrivals specific to that position. in other words, the entire impulse response, including its spatial character, is reproduced by the modal structure.

In the example above, the spatial derivative, and therefore the arrival direction, has been computed analytically. It could have just as easily been computed numerically from the mode spatial functions, or, say, from measurements in the case of a physical space.

C. Output Processing

Figure 6:
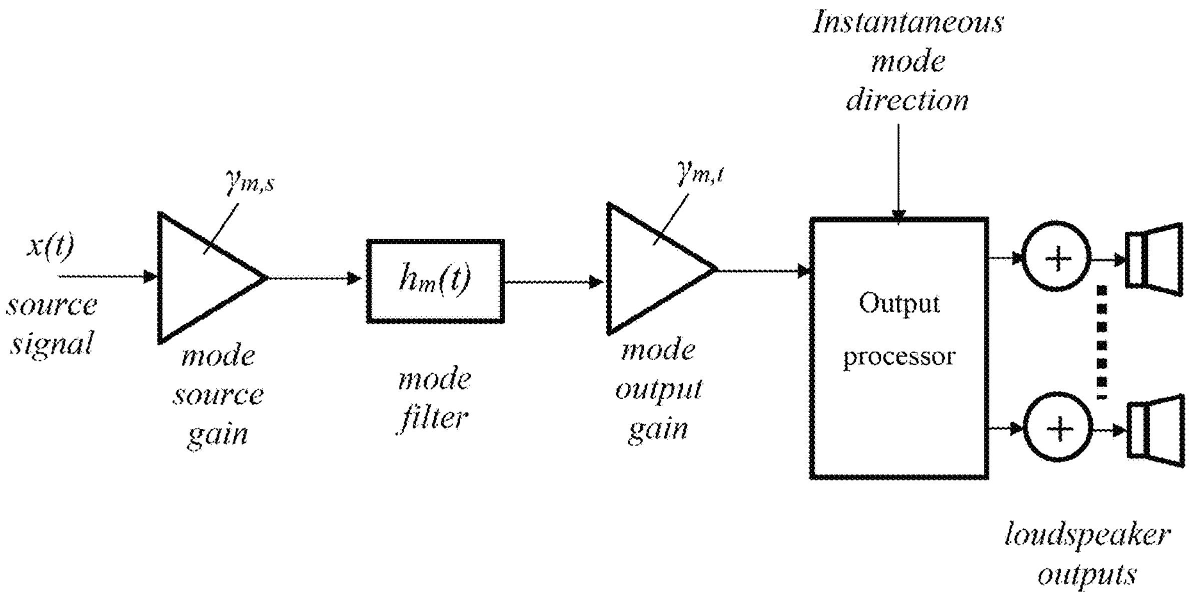
FIG. 6 is a block diagram illustrating an example Mode Output Processing for Loudspeaker or Headphone Listening according to embodiments.

What remains is to process the mode filter outputs according to the target output format, for instance over loudspeakers or headphones. Loudspeaker configurations include stereo, surround sound 5.1 and 7.1, Dolby Atmos 5.1.4, Ambisonics, VBAP, and wavefield synthesis. For all of these formats, the output of each mode is panned among the different output channels according to its instantaneous mode arrival direction. This is seen in FIG. 6 in which a mode output is scaled differently for different output channels according to the instantaneous arrival direction for that mode.

In the case of listening over headphones, the mode outputs maybe processed according to head-related transfer functions to produce a binaural output. Head-related transfer functions (HRTFs) process an input sound to produce left-ear and right-ear outputs that create the perception that the sound is arriving from a particular arrival direction. They do this by filtering and delaying the input signal so as to mimic the effect of sound interacting with the human head and outer ear structures according to the given arrival direction.

In the present embodiments, rather than applying to each mode output an pair of HRTF filters tuned to the evolving instantaneous mode arrival direction, the mode outputs are simply scaled according to left ear and right ear HRTF complex gains evaluated at the mode resonance frequency and varying according to the instantaneous mode arrival direction. This approximation holds since the room modes are very resonant, lasting a significant number of cycles. This structure is the same as shown in FIG. 6, with two output channels, and the gains computed according to the HRTFs.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for simulating acoustics including spatial effects comprising:

identifying a sound signal and sound source position within a space;

identifying a listener and listener position within the space;

processing the sound signal in a parallel bank of mode filters, each mode filter characterized by a mode frequency and one or more of a mode wavenumber, mode spatial gradient or arrival direction, the mode filter thereby computing an evolving output gain according to the mode frequency and the one or more of the wavenumber, gradient or direction; and producing a system output by processing the mode filter outputs according to a target output format.

2. The method of claim 1, wherein the target output format comprises a loudspeaker configuration including one or more of stereo, binaural, surround sound, Dolby Atmos, DTS:X, Auro3D, Ambisonics, VBAP, and wavefield synthesis.

3. A method for simulating acoustics of a space for a listener, the method comprising:

identifying a sound signal, the listener, and the space;

processing the sound signal in a parallel bank of mode filters associated with modes of the space, each mode filter characterized by a mode frequency, and each mode filter producing a spatial component that oscillates at the mode frequency.

4. The method of claim 3, wherein the spatial component is a direction of arrival.

5. A method for simulating acoustics of a space for a listener, the method comprising:

identifying a sound signal, the listener, and the space;

processing the sound signal in a parallel bank of mode filters associated with modes of the space, each mode filter characterized by a mode frequency, and wherein the mode filter outputs are combined to produce an instantaneous spatial component.

6. A method for generating artificial reverberation in response to a source signal, comprising:

configuring parameters of a plurality of mode filters in accordance with properties of the reverberation, wherein the parameters are a set of one of mode frequencies, mode decay times, or mode amplitudes and a set of one of mode phases or mode complex amplitudes, and the properties include one of reverberation decay time, equalization, or mode density.

7. The method of claim 6, wherein the one of reverberation decay time, equalization, or mode density is a function of frequency.

8. The method of claim 6, wherein configuring parameters of the plurality of mode filters is further performed in accordance with an aspect of a reverberation impulse response onset.

9. A method for simulating one of an acoustic space or resonating object in response to a source signal, comprising:

configuring parameters of a plurality of mode filters in accordance with the physical properties of the space or object, wherein the parameters are a set of one of mode frequencies, mode decay times, or mode amplitudes and a set of one of mode phases or mode complex amplitudes; and processing the source signal in parallel using the plurality of mode filters; and summing outputs of the plurality of mode filters to produce a simulation.

10. The method of claim 9, wherein configuring parameters of the plurality of mode filters is further performed for simulating one of a source and receiver having a position relative to the space or object, and wherein the set of one of mode phases or mode complex amplitudes are related to the position.

11. A method for generating artificial reverberation in response to a plurality of source signals, comprising:

configuring parameters of a plurality of mode filters in accordance with properties of the reverberation;

applying to each of the plurality of source signals a set of mode filter input gains to form a corresponding set of source mode filter input signals;

summing the source mode filter input signals over the plurality of sources to form a set of mode filter input signals; and applying the mode filters in parallel to the respective mode filter input signals.

12. The method of claim 11, wherein the set of mode filter gains is found according to the position of the source within a space or object.

13. A method for generating artificial reverberation in response a signal for a plurality of listeners, comprising:

configuring parameters of a plurality of mode filters in accordance with properties of the reverberation;

applying the plurality of mode filters in parallel to the signal to form a set of mode filter outputs; and for each of the plurality of listeners, apply a set of respective mode filter output gains to the mode filter outputs, and sum the set of resulting signals.

14. The method of claim 13, wherein the respective set of mode filter output gains is found according to the position of the each listener within a space or object.

* * * * *